(12) United States Patent
Gupta et al.

(10) Patent No.: US 7,767,630 B2
(45) Date of Patent: *Aug. 3, 2010

(54) METHOD OF TREATING A WELL WITH A GEL STABILIZER

(75) Inventors: D. V. Satyanarayana Gupta, The Woodlands, TX (US); Paul S. Carman, Spring, TX (US)

(73) Assignee: BJ Services Company LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/506,122

(22) Filed: Jul. 20, 2009

(65) Prior Publication Data

US 2010/0016182 A1 Jan. 21, 2010

Related U.S. Application Data

(63) Continuation of application No. 11/184,054, filed on Jul. 18, 2005, now Pat. No. 7,572,757.

(60) Provisional application No. 60/589,144, filed on Jul. 19, 2004.

(51) Int. Cl.
*C09K 8/584* (2006.01)
*E21B 43/16* (2006.01)

(52) U.S. Cl. .................. 507/262; 166/305.1; 166/308.1; 166/308.5; 507/215; 507/216; 507/903; 507/924; 507/925; 516/31; 516/77

(58) Field of Classification Search ................. 507/262, 507/215, 216, 903, 924, 925; 166/305.1, 166/308.1, 308.5; 516/31, 77
See application file for complete search history.

(56) References Cited

U.S. PATENT DOCUMENTS

| | | | |
|---|---|---|---|
| 4,534,870 A | 8/1985 | Williams | |
| 4,619,776 A | 10/1986 | Mondshine | |
| 4,703,799 A | 11/1987 | Jennings et al. | |
| 4,885,103 A | 12/1989 | Putzig et al. | |
| 5,089,151 A | 2/1992 | Hall et al. | |
| 5,362,408 A | 11/1994 | Pakulski et al. | |
| 6,572,783 B1 | 6/2003 | Cai et al. | |
| 6,742,590 B1 | 6/2004 | Nguyen | |
| 7,572,757 B1 * | 8/2009 | Gupta et al. | ................. 507/262 |

* cited by examiner

*Primary Examiner*—Timothy J. Kugel
(74) *Attorney, Agent, or Firm*—Jones & Smith, LLP; John Wilson Jones

(57) ABSTRACT

The present invention relates to the use of chalcogen heterocyclic electron donating compounds as thermal decomposition reduction additives for gels used in well treatment fluids such as drilling fluids, fracturing fluids, and well completion and workover fluids.

20 Claims, No Drawings

METHOD OF TREATING A WELL WITH A GEL STABILIZER

This application is a continuation application of U.S. patent application Ser. No. 11/184,054, filed on Jul. 18, 2005 U.S. Pat. No. 7,572,757 which claims the benefit of U.S. patent application Ser. No. 60/589,144 filed on Jul. 19, 2004.

FIELD OF THE INVENTION

The present invention relates to the use of chalcogen heterocyclic electron donating compounds as thermal oxidative free radical decomposition prevention additives for polymeric gels used in well treatment fluids such as drilling fluids, hydraulic fracturing fluids, and completion and workover fluids.

BACKGROUND OF THE INVENTION

Well treatment fluids often consist of gels formed from soluble dispersible gums mixed with water. Such fluids are particularly useful in the control of fluid loss in gas or oil well drilling operations, as proppant carriers and as fluid loss control agents in well completion and workover operations.

Such applications require the gels to be operational at elevated temperatures. Unfortunately when gels of water soluble gums are exposed to elevated temperatures for any extended length of time, they lose their viscosity in part or in whole and therefore become less effective or completely ineffective. Dissolved oxygen is the major cause of an oxidative free radical polymer breakdown which leads the reactivity of oxygen to increase exponentially with temperature and pressure increases and become significant at high temperatures. Thus, well treatment fluids generally deteriorate rapidly at elevated temperatures. To prevent premature viscosity degradation, oxidation inhibitors or free radical scavengers are a necessary component of gels used in hot wells.

Oxygen scavengers are reducing agents in that they remove dissolved oxygen from water by reducing molecular oxygen to compounds in which oxygen appears in the lower −2 oxidation state. The reduced oxygen then combines with an acceptor atom, molecule or ion to form an oxygen-containing compound. To be suitable as an oxygen scavenger, the reducing agent must have an exothermic heat of reaction with oxygen and have reasonable reactivity at lower temperatures.

In oil field operations, the oxygen scavenger has to remove available oxygen at low temperatures before it can damage vulnerable polysaccharide gums at higher temperatures. Oil field applicable oxygen scavengers must have a limited lifetime. They should be consumed in the course of a treatment so that they do not interfere with the after treatment gel breaking process Chemical incompatibility between reducing agents and crosslinkers further creates another product choice limitation. Since all oxygen scavengers are reducing compounds, they are electron donors. Electron donors are Lewis bases capable of chelating metals which makes them unsuitable for application in metal crosslinked gels. Based on the above limitations, most common antioxidants have been rejected from oil field applications.

Compositions for the reduction of thermal degradation of aqueous gels by the addition of a gel stabilizer have been reported in U.S. Pat. No. 5,362,408 wherein the stabilizer contains an oxime as electron donor compound. Such donor compounds were shown as being capable of stabilizing gels at temperatures as high as 150° C. (302° F.). A need exists for well treatment fluids of gels capable of being stabilized at temperatures as high as 204.5° C. (400° F.) as deeper wells are explored.

SUMMARY OF THE INVENTION

The present invention relates to aqueous gelled well treatment fluids and a process for the substantial reduction of thermal degradation of such gels by the addition of chalcogen heterocyclic electron donating compounds and to methods of using well treatment fluids in wells penetrating a subterranean formation. Such chalcogen heterocyclic electron donating compounds are of the formulae:

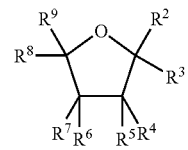

Fig. I

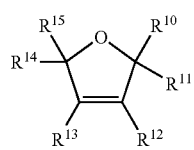

Fig. II

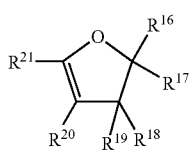

Fig. III

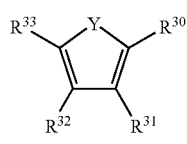

Fig. IV

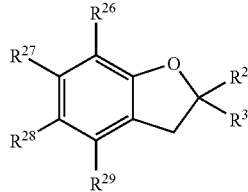

Fig. V

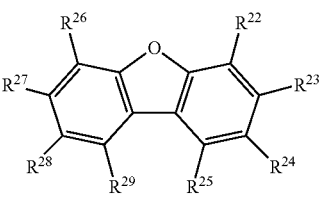

Fig. VI

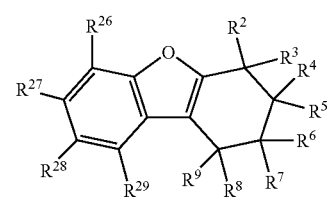

Fig. VII

-continued

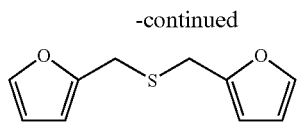

Fig. VIII wherein:
—$R^1$ is —H or —$CH_2Z$;
—Z is —H or —X;
—X is —Cl or —Br;
—$R^2$, $R^3$, $R^4$, $R^5$, $R^6$, $R^7$, $R^8$, $R^9$, $R^{10}$, $R^{11}$, $R^{14}$, $R^{15}$, $R^{16}$, $R^{17}$, $R^{18}$, and $R^{19}$ are independently selected from $R^1$; $NO_2$; or $R^2$ with $R^3$, $R^4$ with $R^5$, $R^6$ with $R^7$, $R^8$ with $R^9$, $R^{10}$ with $R^{11}$, $R^{14}$ with $R^{15}$, $R^{16}$ with $R^{17}$, or $R^{18}$ with $R^{19}$, and the adjoining carbon on the heterocyclic ring, form a C=O group;
$R^{12}$, $R^{13}$, $R^{20}$ and $R^{21}$ are —H;
$R^{30}$, $R^{31}$, $R^{32}$ and $R^{33}$ are independently selected from $R^1$,

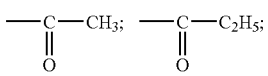

—$CH(OCH_2CH_3)_2$; or —$SCH_3$;
Y is —O or —S; and
$R^{22}$, $R^{23}R^{24}R^{25}$, $R^{26}$, $R^{27}$, $R^{28}$ and $R^{29}$ are independently selected from —X, $R^1$ or —$NO_2$.

The well treatment fluid has particular applicability as a hydraulic fracturing fluid, completion fluid, workover fluid and drilling fluid.

DETAILED DESCRIPTION OF THE PREFERRED EMBODIMENTS

It has been discovered that chalcogen heterocyclic compounds containing oxygen or sulfur are useful for extending the high temperature effectiveness of aqueous gels commonly used in oil field operations. It has been found that such compounds prevent the thermal degradation of such gels at temperatures above 165.5° C. (330° F.) and as high as 204.5° C. (400° F.) or higher and stabilize the gels at such ultrahigh temperatures. The reaction kinetics are fast enough even at low temperatures to stabilize such gels. The sterically unhindered oxygen atom on the heterocyclic compound carries two unshared pairs of electrons which provide the electron donation for gel stability.

The chalcogen heterocyclic electron donating compounds are of the formulae:

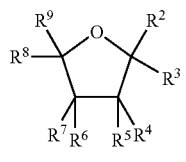

Fig. I

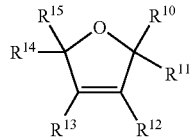

Fig. II

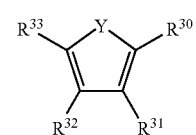

Fig. III

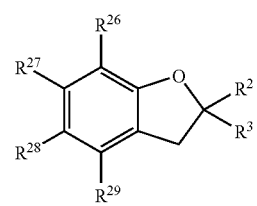

Fig. IV

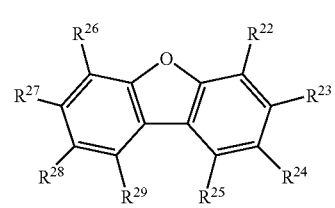

Fig. V

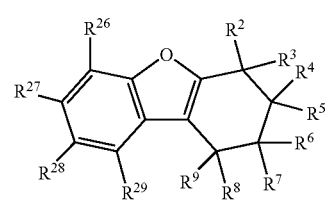

Fig. VI

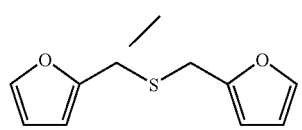

Fig. VII

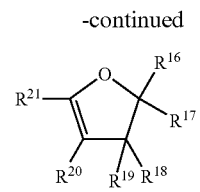

Fig. VIII wherein:
—$R^1$ is —H or —$CH_2Z$;
—Z is —H or —X;
—X is —Cl or —Br;
—$R^2$, $R^3$, $R^4$, $R^5$, $R^6$, $R^7$, $R^8$, $R^9$, $R^{10}$, $R^{11}$, $R^{14}$, $R^{15}$, $R^{16}$, $R^{17}$, $R^{18}$, $R^{19}$ are independently selected from $R^1$; $NO_2$; or $R^2$ with $R^3$, $R^4$ with $R^5$, $R^6$ with $R^7$, $R^8$ with $R^9$, $R^{10}$ with $R^{11}$, $R^{14}$ with $R^{15}$, $R^{16}$ with $R^{17}$, or $R^{18}$ with $R^{19}$, and the adjoining carbon on the heterocyclic ring, form a C=O group;
$R^{12}$, $R^{13}$, $R^{20}$ and $R^{21}$ are —H;

$R^{30}$, $R^{31}$, $R^{32}$ and $R^{33}$ are independently selected from $R^1$,

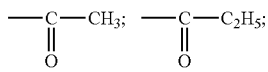

—CH(OCH$_2$CH$_3$)$_2$, —SCH$_3$;

Y is —O or —S; and $R^{22}$, $R^{23}$, $R^{24}$, $R^{26}$, $R^{27}$, $R^{28}$ and $R^{29}$ are independently selected from —X, $R^1$ or —NO$_2$.

Particularly preferred are furan; tetrahydrofuran; 3-methyltetrahydrofuran; 2-(diethoxymethyl)furan; 2-methyl-5-(methylthio)furan; difurfurylsulfide; 2,3-dihydro-2,2-dimethyl-7-nitrobenzofuran; dibenzofuran; 1,2,3,4-tetrahydrodibenzofuran; 2-acetyl-5-methyl furan; tetrahydrofurfuryl bromide; 2,3-dihydrofuran; 2,2-dimethyltetrahydrofuran; 2,5-dimethyltetrahydrofuran; 2,3,4,5-tetramethylfuran; 2-methyl-5-propionyl-furan; 3-acetyl-2,5-dimethylfuran; 2-acetylfuran; 2-acetyl-2,5,-dimethyl furan; bromotrichlorodibenzofuran; thiophene; succinic anhydride; and maleic anhydride.

The amount the chalcogen heterocyclic electron donating compound needs to stabilize a gel will be an effective amount depending on the amount of oxygen present in the gel and the gels subsequent exposure to atmospheric oxygen, for example, during blending with a proppant. The amount of the chalcogen heterocyclic electron donating compound employed according to the present invention will therefore be that necessary to scavenge the oxygen existing in any particular situation, plus some excess so as to maintain a small residual amount of additive while stabilization is needed. Normally, from about 4.5 to about 20 parts by weight of the compound will be required to remove one part by weight of dissolved oxygen. In practice, however, an excess of the compound will be employed to assure a fast and complete oxygen removal. The amount of the compound will usually be measured in terms of the amount of gel being treated. Typical loadings of the chalcogen heterocyclic electron donating compound may vary from 0.01 parts per thousand by weight to 100 parts per thousand, preferably 0.1 part per thousand to 50 parts per thousand, and most preferably from 0.5 parts per thousand to 20 parts per thousand, based on the gelled composition.

The reaction of the chalcogen heterocyclic electron donating compound with oxygen is temperature dependent and its reactivity is relatively independent of pH. The gelled composition has a pH of from about 3.5 to about 11.5. This characteristic makes the chalcogen heterocyclic electron donating compound a very universal oxygen scavengers/gel stabilizer for oil field applications at basic or acidic conditions.

The chalcogen heterocyclic electron donating compound may be used in combination with a second conventional oxygen scavenger such as sodium thiosulfate, sodium sulfite, sodium bisulfite, pyrogallic acid, pyrogallol, catechal, sodium erthythrobate, ascorbic acid, an amine, resorcinol, stannous chloride, quinone and hydroquinone, and mixtures thereof. Typically, when employed, the weight percent ratio of chalcogen heterocyclic electron donating compound:second conventional oxygen scavenger is between from about 0.01 to about 1, preferably from about 0.1 to about 0.2.

The gels which can be used with the thermal decomposition reduction additive of the present invention include, but are not limited to, any polymer viscosifier or mixture of polymers known in the art for use in formulation of polymer-containing treatment fluids. Suitable polymer substrates include polysaccharides, synthetic polymers, or mixtures thereof. Examples of such polymers include, but are not limited to polysaccharides and/or acrylic polymers. Preferred are gels formed when a soluble dispersible gum is mixed with water. These gels can include galactomannan gums and their derivatives, glucomannan gums and their derivatives, guar gum, locust bean gum, cara gum, carboxymethyl guar, hydroxyethyl guar, hydroxypropyl guar, carboxymethylhydroxyethyl guar, carboxymethylhydroxypropyl guar, cellulose and its derivatives, hydroxypropyl cellulose, hydroxymethyl cellulose, hydroxyethyl cellulose and carboxymethyl cellulose.

In a particularly preferred embodiment, the gums are CMHEC (carboxymethyl hydroxyethyl cellulose), HC (hydroxy cellulose), HEC (hydroxyethyl cellulose). Specific examples of polysaccharides include, but are not limited to, guar, CMC (carboxymethyl cellulose), CMG (carboxymethyl guar), CMHPG (carboxymethyl hydroxypropyl guar), HPG (hydroxypropyl guar), and xanthan. These polymers are available, for example, from BJ Services as "GW4" (guar), "GW21" (HEC), "GW22" (xanthan gum), "GW24L" (HEC slurry), "GW45" (CMG), "GW27" (guar), "GW28" (CMHEC), "GW32" (HPG), and "GW38" (CMHPG), respectively. Slurried counterparts of these polymers are available from BJ Services as "XLFC1" (guar), "XLFC1B" (guar), "XLFC2" (HPG), "XLFC2B" (HPG), "XLFC3" (CMPHG) "XLFC3B" (CMHPG), "VSP1" (CMG), and "VSP2" (CMG), respectively. A typical polymer substrate is CMHPG.

The composition of the invention may further include at least one optional crosslinking agent effective to crosslink the polymeric gel. In this regard, any crosslinking agent suitable for crosslinking the gel may be employed, including those crosslinking agents known in the well treating art. Examples of suitable crosslinking agents include, but are not limited to, metal ions such as aluminum, antimony, zirconium and titanium-containing compounds, including the so-called organometallics. Transition metals such as zirconium and titanium crosslinkers are preferred, as well as borate ion donating materials. See, for example, U.S. Pat. No. 5,082,579, U.S. Pat. No. 5,145,590, U.S. Pat. No. 5,160,643, U.S. Pat. No. 5,201,370, and U.S. Pat. No. 5,562,160, which are incorporated by reference herein in their entirety. Examples of borate-based crosslinkers include, but not limited to, organoborates, monoborates, polyborates, mineral borates, etc.

In a most preferred embodiment of the invention, the treatment fluid may be a guar or derivatized guar-based fracturing fluid, such as one based on carboxymethyl hydroxypropyl guar polymer. For example, in one embodiment, carboxymethyl hydroxypropyl guar polymer is employed with a zirconium-based crosslinker The chalcogen heterocyclic electron donating compound according to the present invention can be added to the mix water prior to or at the same time as other additives are added to a water based oil field gel. The chalcogen heterocyclic electron donating compound could be added on-the-fly if necessary for continuous process operation.

The fluids have particular applicability as fracturing fluids for fracturing subterranean formations, including those formations surrounding oil or gas wells. Propping agents, which may be employed with the well treatment fluids, include any propping agent suitable for hydraulic fracturing known in the art. Examples include, but are not limited to, silica, quartz sand grains, glass and ceramic beads, walnut shell fragments, aluminum pellets, nylon pellets, resin-coated sand, synthetic organic particles, glass microspheres, sintered bauxite, mixtures thereof and the like. In this regard, propping agents are typically used in concentrations of between about 1 to about 18 pounds per gallon of fracturing fluid composition, but higher or lower concentrations may also be used as required.

Furthermore, it will be understood with benefit of the present disclosure that an enzyme pre-treatment fluid may precede a polymer-containing treatment fracture fluid having no proppant. Furthermore, the base fluid may also contain other conventional additives common to the well service industry, such as surfactants, and the like.

The following examples will illustrate the practice of the present invention in its preferred embodiments. From the foregoing, it will be observed that numerous variations and modifications may be effected without departing from the true spirit and scope of the novel concepts of the invention.

Examples 1-15

Unless stated to the contrary, the term "percent" herein refers to weight percent.

The following components are used in the Examples below:

WG-17 is carboxymethyl guar, a product available from BJ Services Company, Canada;

GW-38 is carboxymethylhydroxypropyl guar, a product available from BJ Services Company;

GW-46 is carboxymethyl guar, a product available from BJ Services Company;

CXZ-2 is a zirconium crosslinker, a product available from BJ Services Company;

XLW-14 is a zirconium crosslinker, a product available from BJ Services Company;

CC-2 is choline chloride, a clay protectant; a product available from BJ Services Company; and GS-1A is sodium thiosulfate, a product available from BJ Services Company;

Polymeric gum, crosslinker, optional clay protectant, chalcogen heterocyclic compound and thiosulfate oxygen scavenger were premixed at room temperature for 2 minutes as set forth in Table I. In the Comparative Examples, THF was either deleted or substituted with methylethylketone oxime or sodium bicarbonate.

TABLE I

| Ex. No. | Fluid pH WG-17 | GW-38 | GW-46 | CXZ-2 | XLW-14 | CC-2 | GS-1A | THF | Other | Other Conc. |
|---|---|---|---|---|---|---|---|---|---|---|
| *1 | 8.3 6 Kg/m3 (50 PPTG) | | | 4.25 L/m3 (GPT) | | 1 L/m3 (GPT) | 1.5 Kg/m3 (12.5 PPT) | | | |
| *2 | 8.3 6 Kg/m3 (50 PPTG) | | | 4.25 L/m3 (GPT) | | 1 L/m3 (GPT) | 1.5 Kg/m3 (12.5 PPT) | | MEKoxime | 1.5 Kg/m3 (12.5PPT) |
| 3 | 8.3 6 Kg/m3 (50 PPTG) | | | 4.25 L/m3 (GPT) | | 1 L/m3 (GPT) | 1.5 Kg/m3 (12.5 PPT) | 10 L/m3 (GPT) | | |
| 4 | 9.8 8 Kg/m3 (67 PPTG) | | | 4.25 L/m3 (GPT) | | 1 L/m3 (GPT) | 1.5 Kg/m3 (12.5 PPT) | 20 L/m3 (GPT) | | |
| 5 | 9.8 8 Kg/m3 (67 PPTG) | | | 4.25 L/m3 (GPT) | | 1 L/m3 (GPT) | 1.5 Kg/m3 (12.5 PPT) | 20 L/m3 (GPT) | | |
| 6 | 9.8 8 Kg/m3 (67 PPTG) | | | 4.25 L/m3 (GPT) | | 1 L/m3 (GPT) | 1.5 Kg/m3 (12.5 PPT) | 20 L/m3 (GPT) | | |
| 7 | 9.8 8 Kg/m3 (67 PPTG) | | | 4.25 L/m3 (GPT) | | 1 L/m3 (GPT) | 1.5 Kg/m3 (12.5 PPT) | 20 L/m3 (GPT) | | |
| 8 | 9.8 8 Kg/m3 (67 PPTG) | | | 4.25 L/m3 (GPT) | | 1 L/m3 (GPT) | 1.5 Kg/m3 (12.5 PPT) | 28 L/m3 (GPT) | | |
| 9 | 9.7 8 Kg/m3 (67 PPTG) | | | 4.25 L/m3 (GPT) | | 1 L/m3 (GPT) | 1.5 Kg/m3 (12.5 PPT) | 20 L/m3 (GPT) | | |
| *10 | 9 | 9.6 Kg/m3 (80 PPTG) | | | 1.6 L/m3 (GPT) | | 1.8 Kg/m3 (15 PPT) | | Sodium Bicarbonate | 1.2 Kg/m3 (10 PPT) |
| *11 | 9 | | 9.6 Kg/m3 (80 PPTG) | | 1.4 L/m3 (GPT) | | 1.8 Kg/m3 (15 PPT) | | | |
| 12 | 9.5 8.4 Kg/m3 (70 PPT) | | | 4.5 L/m3 (GPT) | | | 1.5 Kg/m3 (12.5 PPT) | 20 L/m3 (GPT) | | |
| 13 | 9.5 8.4 Kg/m3 (70 PPT) | | | 4.5 L/m3 (GPT) | | | 1.5 Kg/m3 (12.5 PPT) | 20 L/m3 (GPT) | | |
| 14 | 9.5 8.4 Kg/m3 (70 PPT) | | | 4.5 L/m3 (GPT) | | | 1.5 Kg/m3 (12.5 PPT) | 20 L/m3 (GPT) | | |
| 15 | 9.5 8.4 Kg/m3 (70 PPT) | | | 4.5 L/m3 (GPT) | | | 1.5 Kg/m3 (12.5 PPT) | 20 L/m3 (GPT) | | |

*Comparative Examples
Effects of Temperature on Gel Viscosity. The composition was maintained at a temperature up to 400° F. for up to 180 minutes and the viscosity was measured. The effective viscosity was measured at a continuous shear rate of 100 sec$^{-1}$ or 40 sec$^{-1}$ with a high pressure and high temperature rheometer (Fann 50 or Brookfield PVT) at the various temperatures. The results are set forth in Table II (100 sec$^{-1}$ shear rate) and Table III (40 sec$^{-1}$ shear rate) below.

TABLE II

| | Ex. No. | | | | | | | | |
|---|---|---|---|---|---|---|---|---|---|
| | *1 | *2 | 3 | 4 | 5 | 6 | 7 | 8 | 9 |
| | | | | | Temperature | | | | |
| | 180 C. (356 F.) | 180 C. (356 F.) | 180 C. (356 F.) | 180 C. (356 F.) | 170 C. (338 F.) | 180 C. (356 F.) | 190 C. (374 F.) | 200 C. (392) | 200 C. (392 F.) |
| Viscosity @ 100 Sec−1: Time 0 mts @ Temp. | 407 | 727 | 1230 | 716 | 750 | 900 | 1920 | 758 | 642 |
| Viscosity @ 100 Sec−1: Time 30 mts @ Temp. | 105 | 208 | 616 | 514 | 580 | 960 | 650 | 450 | 382 |
| Viscosity @100 Sec−1: Time 45 mts @ Temp. | 80 | 206 | 158 | 453 | 645 | 892 | 640 | 153 | 345 |
| Viscosity @100 Sec−1: Time 60 mts @ Temp. | 51 | 51 | 90 | 435 | 650 | 416 | 586 | 108 | 120 |
| Viscosity @100 Sec−1: Time 75 mts @ Temp. | 17 | 17 | | 260 | 220 | 358 | 400 | 80 | |
| Viscosity @100 Sec−1: Time 90 mts @ Temp. | | | | 280 | 200 | 360 | 150 | 74 | |
| Viscosity @100 Sec−1: Time 120 mts @ Temp. | | | | 280 | 190 | 350 | 135 | 60 | |
| Viscosity @100 Sec−1: Time 150 mts @ Temp. | | | | 175 | 190 | 312 | 120 | | |
| Viscosity @100 Sec−1: Time 180 mts @ Temp. | | | | | | 173 | 112 | | |

*Comparative Examples

TABLE III

| | Test No. | | | | | |
|---|---|---|---|---|---|---|
| | *10 | *11 | 12 | 13 | 14 | 15 |
| | | | Temperature | | | |
| | 204 C. (400 F.) | 204 C. (400 F.) | 149 C. (330 F.) | 182 C. (360 F.) | 193 C. (380 F.) | 204 C. (400 F.) |
| Viscosity @ 40 Sec−1; Time 0 mts @ Temp. | 197 | 53 | 1891 | 1480 | 1371 | 2000 |
| Viscosity @ 40 Sec−1; Time 30 mts @ Temp | | 10 | 970 | 924 | 640 | 586 |
| Viscosity @ 40 Sec−1; Time 45 mts @ Temp. | | | 823 | 521 | 150 | 112 |
| Viscosity @ 40 Sec−1; Time 60 mts @ Temp. | | | 822 | 530 | 144 | 108 |

*Comparative Examples

Compositions containing THF, as set forth in Examples 3-9, render higher viscosity over an extended period of time. In addition to an increase in time, compositions containing THF further exhibit high viscosity at elevated temperatures. Examples 3-9 compare THF containing compositions with Comparative Examples 1 and 2 at 100 sec$^{-1}$ shear rate. Examples 12-15 contrast the THF containing compositions with Comparative Examples 10 and 11 at 40 sec$^{-1}$ shear rate.

From the foregoing, it will be observed that numerous variations and modifications may be effected without departing from the true spirit and scope of the novel concepts of the invention.

What is claimed is:

1. A method for treating a well penetrating a subterranean formation which comprises introducing into the well a treatment fluid comprising a gel and an effective gel stabilizing amount of a chalcogen heterocyclic electron donating compound selected from the group consisting of:

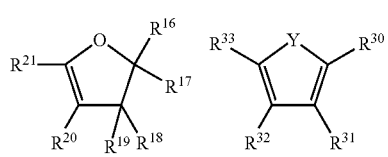

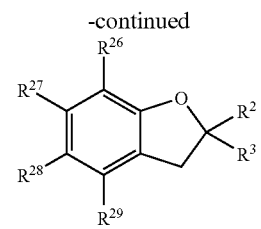

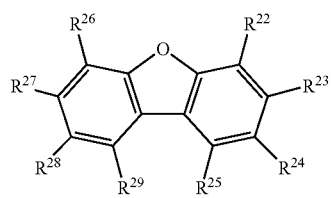

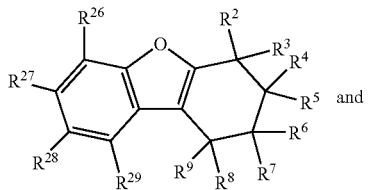

and

-continued

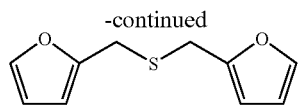

wherein:
—$R^1$ is H or —$CH_2Z$;
—Z is —H or —X;
—X is —Cl or —Br;
—$R^2, R^3, R^4, R^5, R^6, R^7, R^8, R^9, R^{16}, R^{17}, R^{18}$, and $R^{19}$ are independently selected from $R^1$; $NO_2$; or $R^2$ with $R^3$, $R^4$ with $R^5$, $R^6$ with $R^7$, $R^8$ with $R^9$, $R^{16}$ with $R^{17}$, and $R^{18}$ with $R^{19}$, and the adjoining carbon on the heterocyclic ring, form a C=O group;
$R^{20}$ and $R^{21}$ are —H;
$R^{30}, R^{31}, R^{32}$ and $R^{33}$ are independently selected from $R^1$,

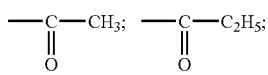

—$CH(OCH_2CH_3)_2$, —$SCH_3$;
Y is —O or —S; and
$R^{22}, R^{23}, R^{24}, R^{25}, R^{26}, R^{27}, R^{28}$ and $R^{29}$ are independently selected from —X, $R^1$ and —$NO_2$.

2. The method of claim 1, wherein the gel is a polymer selected from the group consisting of galactomannan gums, galactomannan gum derivatives, glucomannan gums, glucomannan gum derivatives, guar gum, locust bean gum, cara gum, carboxymethyl guar, hydroxyethyl guar, hydroxypropyl guar, carboxymethylhydroxyethyl guar, carboxymethylhydroxypropyl guar cellulose, cellulose derivatives, hydroxypropyl cellulose, hydroxymethyl cellulose, hydroxyethyl cellulose, and carboxymethyl cellulose.

3. The method of claim 2, wherein the gel further comprises a crosslinking agent.

4. The method of claim 3, wherein the crosslinking agent contains a metal ion.

5. The method of claim 4, wherein the metal ion is selected from the group consisting of aluminum, antimony, zirconium and titanium.

6. The method of claim 5, wherein the crosslinking agent is selected from the group consisting of organozirconates and organoborates.

7. The method of claim 2, wherein the gel is carboxymethyl guar or carboxymethylhydroxypropyl guar.

8. The method of claim 1, wherein the chalcogen heterocyclic electron donating compound prevents thermal degradation of the gel at temperatures to as high as 204.5° C.

9. The method of claim 1, which further comprises an oxygen scavenger other than the chalcogen heterocyclic electron donating compound.

10. The method of claim 1, wherein the chalcogen heterocyclic electron donating compound is present in an amount of from 0.01 to about 100 parts per thousand parts of the gel.

11. The method of claim 1, wherein the gel has a pH of about 3.5 to about 11.5.

12. The method of claim 1, wherein the chalcogen heterocyclic electron donating compound is present in an amount effective to provide a gelled composite throughout the use of the gelled composition in oilfield hydraulic fracturing, completion and/or workover operations.

13. The method of claim 1, wherein the treatment fluid is a hydraulic fracturing fluid or a completion fluid.

14. A method of preventing thermal degradation of an aqueous gel during treatment of a well which comprises introducing into the well an effective gel stabilizing amount of a chalcogen heterocyclic electron donating compound selected from the group consisting of:

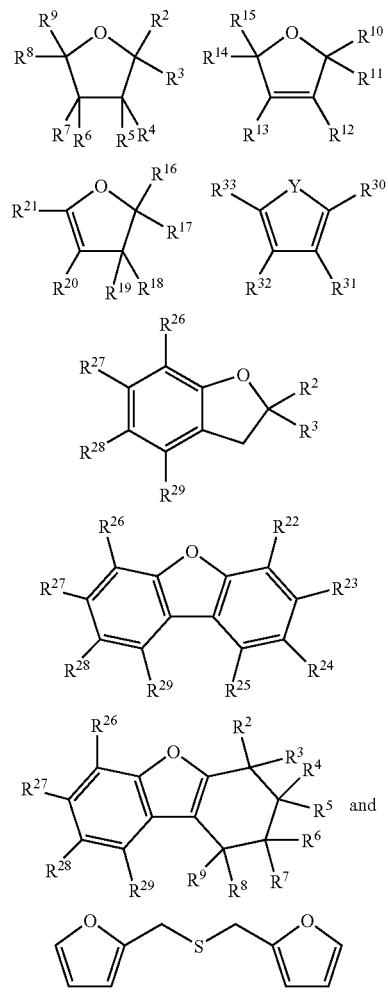

wherein:
—$R^1$ is —H or —$CH_2Z$;
—Z is —H or —X;
—X is —Cl or —Br;
—$R^2, R^3, R^4, R^5, R^6, R^7, R^8, R^9, R^{10}, R^{11}, R^{14}, R^{15}, R^{16}, R^{17}, R^{18}$ and $R^{18}, R^{19}$ are independently selected from $R^1$; $NO_2$; or $R^2$ with $R^3$, $R^4$ with $R^5$, $R^6$ with $R^7$, $R^8$ with $R^9$, $R^{10}$ with $R^{11}$, $R^{14}$ with $R^{15}$, $R^{16}$ with $R^{17}$, and $R^{18}$ with $R^{19}$, and the adjoining carbon on the heterocyclic ring, form a C=O group;
$R^{12}, R^{13}, R^{20}$ and $R^{21}$ are —H;
$R^{30}, R^{31}, R^{32}$ and $R^{33}$ are independently selected from $R^1$,

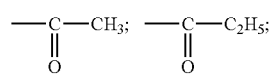

—CH(OCH$_2$CH$_3$)$_2$, —SCH$_3$;

Y is —O or —S; and

R$^{22}$, R$^{23}$, R$^{24}$, R$^{25}$, R$^{26}$, R$^{27}$, R$^{28}$ and R$^{29}$ are independently selected from —X, R$^1$ or —NO$_2$ wherein the amount of chalcogen heterocyclic electron donating compound added to the well is between from about 0.01 to about 100 parts per thousand of the aqueous gel and further wherein the pH of the aqueous gel is between from about 3.5 to about 11.5.

15. The method of claim 14, wherein the aqueous gel contains a crosslinking agent.

16. The method of claim 15, wherein the crosslinking agent is a metal ion selected from the group consisting of aluminum, antimony, zirconium and titanium.

17. The method of claim 14, wherein the aqueous gel contains a polymer selected from the group consisting of galactomannan gums, galactomannan gum derivatives, glucomannan gums, glucomannan gum derivatives, guar gum, locust bean gum, cara gum, carboxymethyl guar, hydroxyethyl guar, hydroxypropyl guar, carboxymethylhydroxyethyl guar, carboxymethylhydroxypropyl guar cellulose, cellulose derivatives, hydroxypropyl cellulose, hydroxymethyl cellulose, hydroxyethyl cellulose, and carboxymethyl cellulose.

18. In a method for treating a well wherein an aqueous gel is added to the well, the improvement being the addition to the well of an effective gel stabilizing amount of a chalcogen heterocyclic electron donating compound of the structural formula:

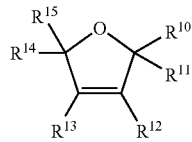

wherein:
- —R$^1$ is —H or —CH$_2$Z;
- —Z is —H or —X;
- —R$^{10}$, R$^{11}$, R$^{14}$ and R$^{15}$ are independently selected from R$^1$; NO$_2$; or R$^{10}$ with R$^{11}$ and R$^{14}$ with R$^{15}$ and the adjoining carbon on the heterocyclic ring, form a C=O group; and
- —R$^{12}$ and R$^{13}$ are —H.

19. The method of claim 18, wherein the aqueous gel contains a polymer selected from the group consisting of galactomannan gums, galactomannan gum derivatives, glucomannan gums, glucomannan gum derivatives, guar gum, locust bean gum, cara gum, carboxymethyl guar, hydroxyethyl guar, hydroxypropyl guar, carboxymethylhydroxyethyl guar, carboxymethylhydroxypropyl guar cellulose, cellulose derivatives, hydroxypropyl cellulose, hydroxymethyl cellulose, hydroxyethyl cellulose, and carboxymethyl cellulose.

20. The method of claim 19, wherein the aqueous gel further contains a crosslinking agent having a metal ion selected from the group consisting of aluminum, antimony, zirconium and titanium.

* * * * *

UNITED STATES PATENT AND TRADEMARK OFFICE
CERTIFICATE OF CORRECTION

PATENT NO. : 7,767,630 B2
APPLICATION NO. : 12/506122
DATED : August 3, 2010
INVENTOR(S) : Gupta et al.

Page 1 of 1

It is certified that error appears in the above-identified patent and that said Letters Patent is hereby corrected as shown below:

Column 12 line 54 should read:

$R^{17}$, $R^{18}$, and $R^{19}$ are independently selected from

Signed and Sealed this

Twenty-eighth Day of September, 2010

David J. Kappos
*Director of the United States Patent and Trademark Office*